Apr. 10, 1923.  
J. C. FRENCH  
1,451,018
MOTOR TRUCK DUMPING VEHICLE
Original Filed Mar. 13, 1918  7 sheets-sheet 5
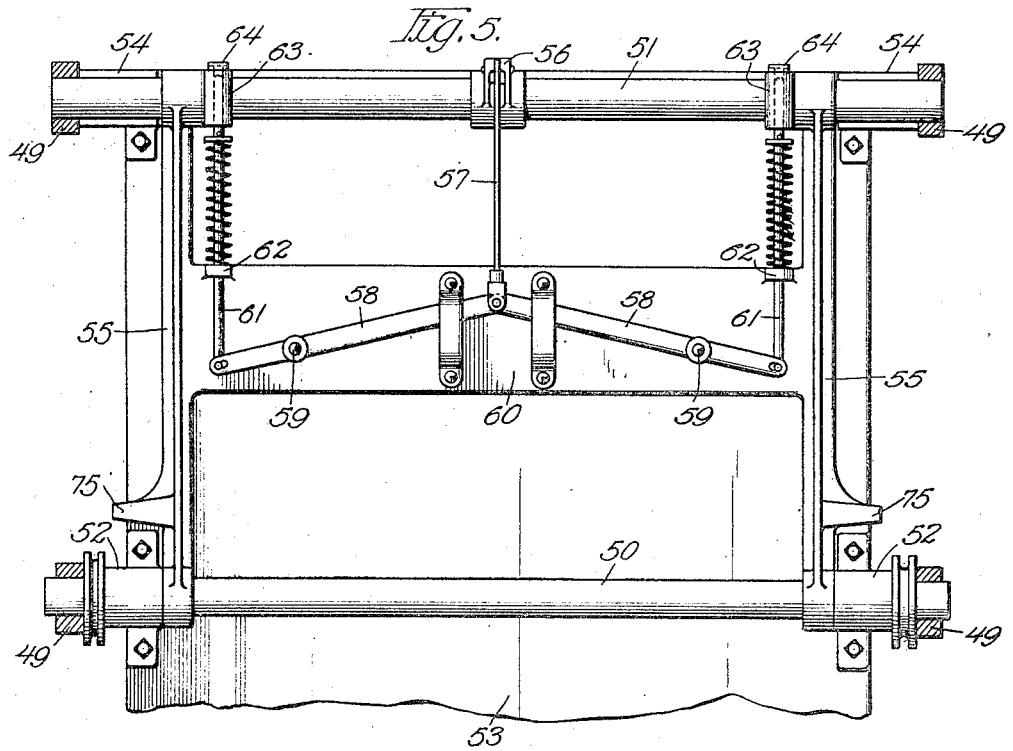
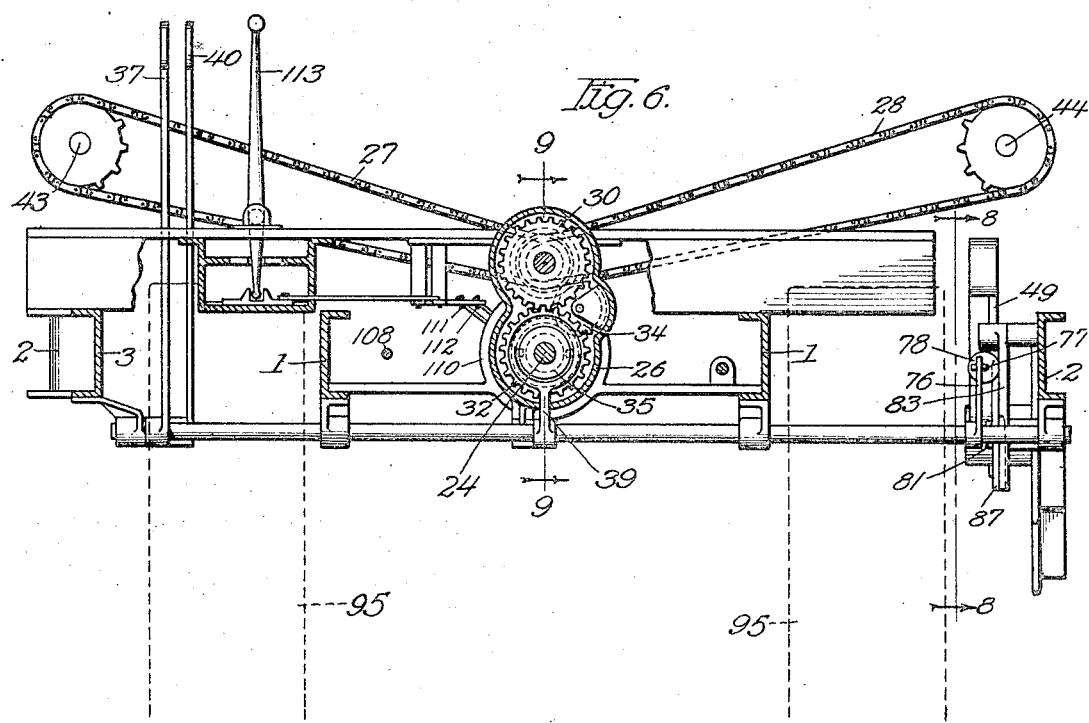

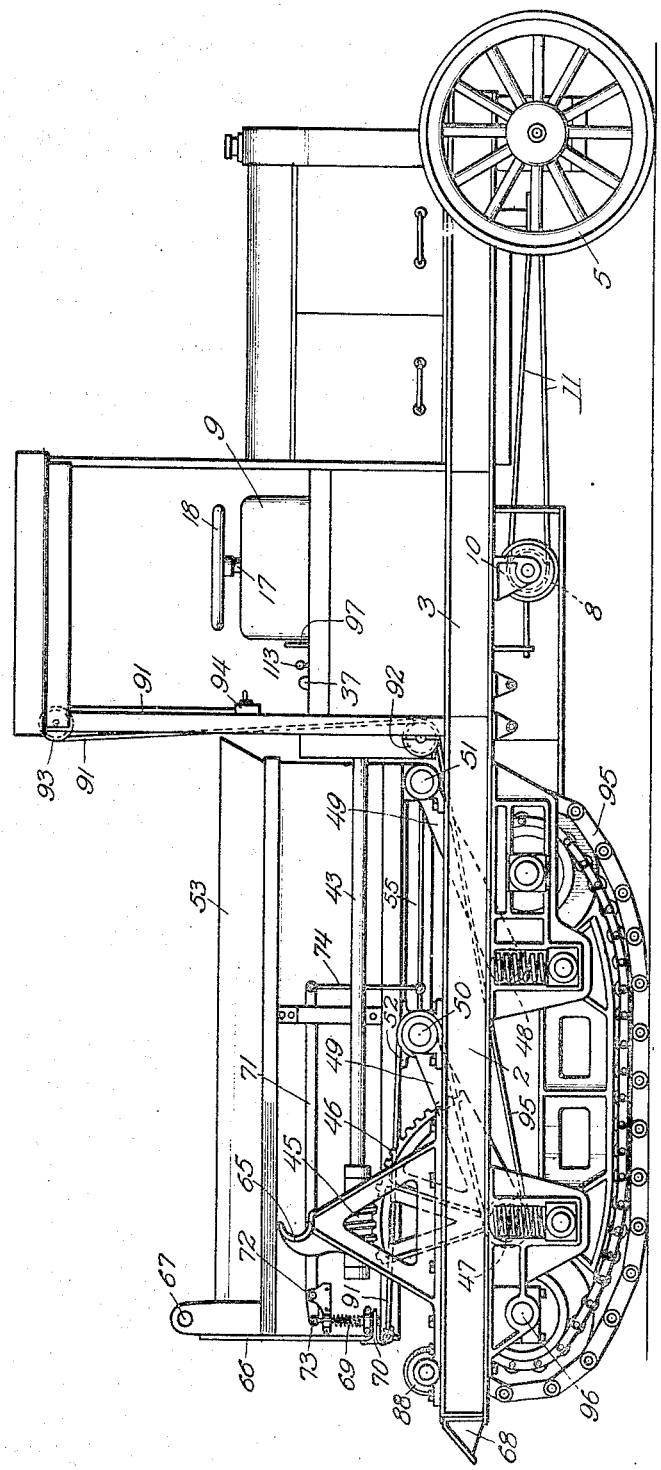

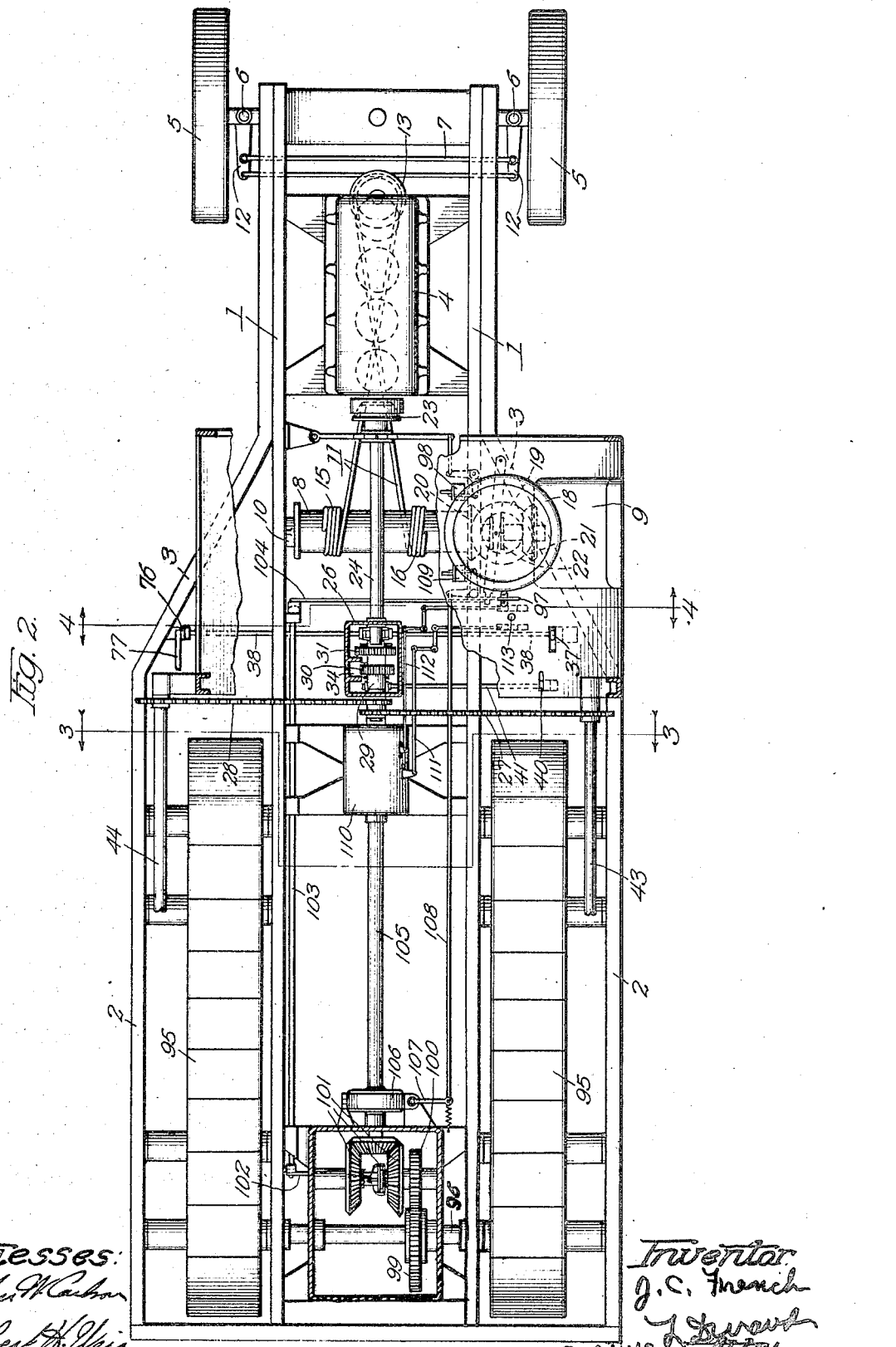

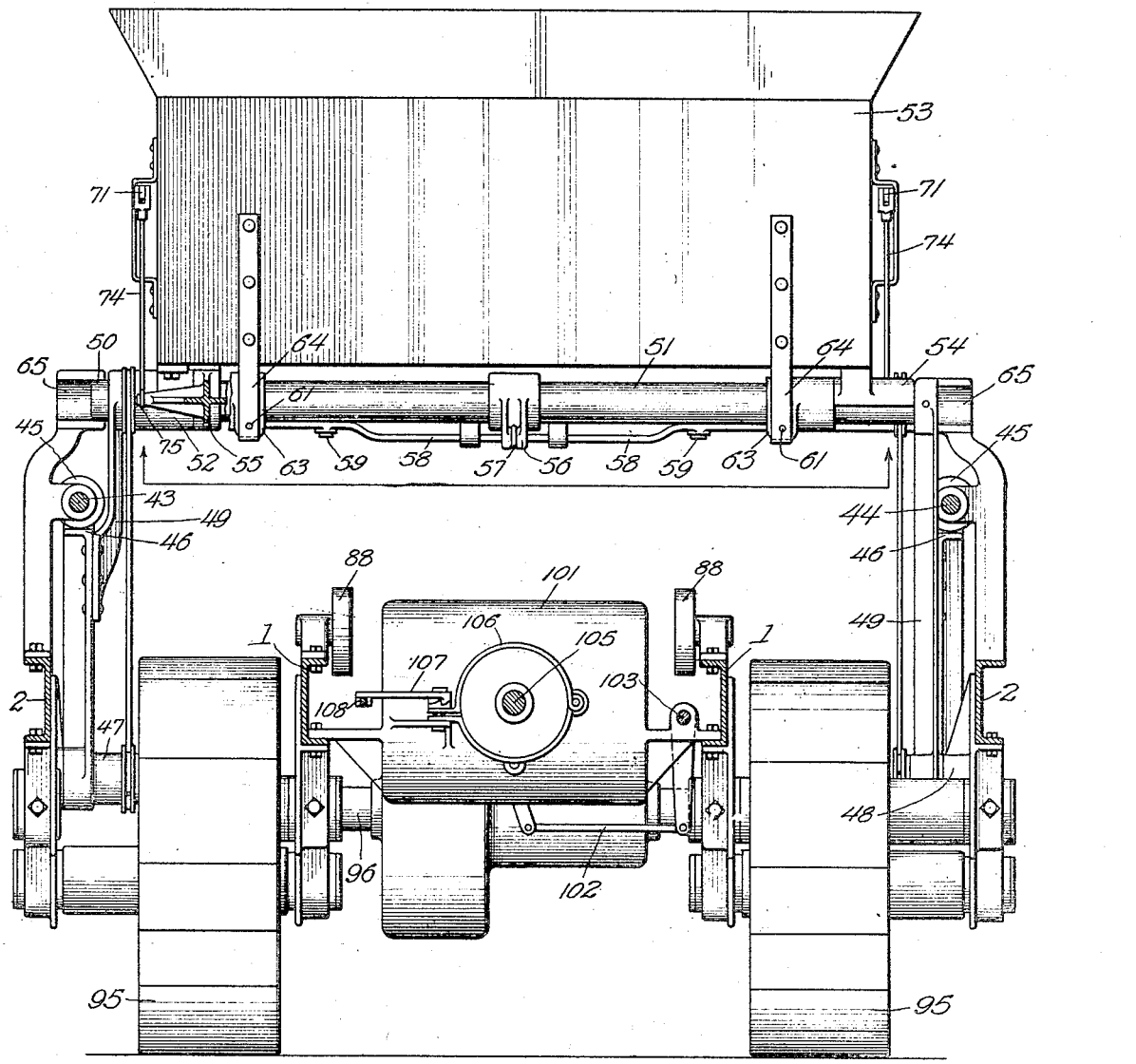

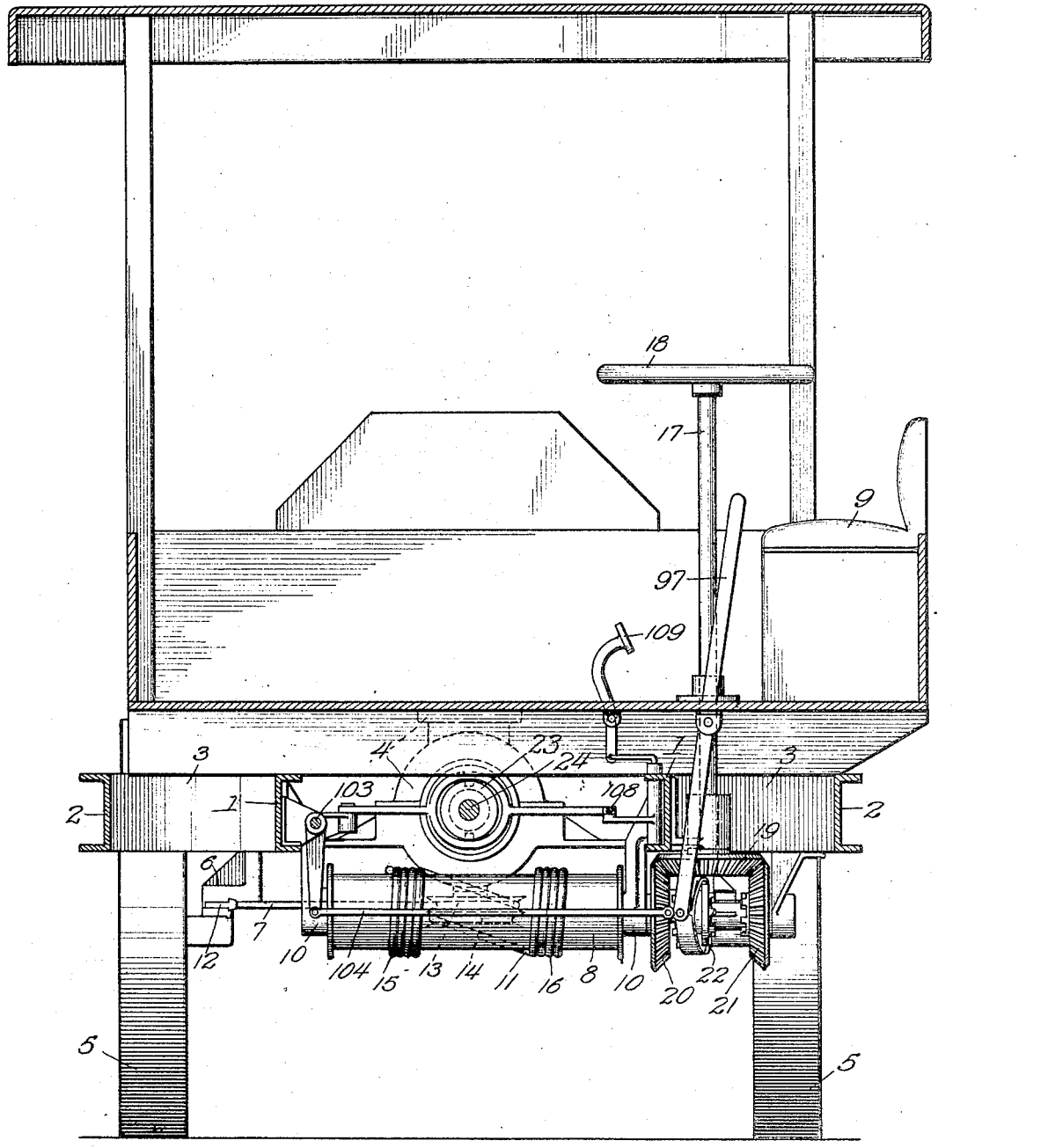

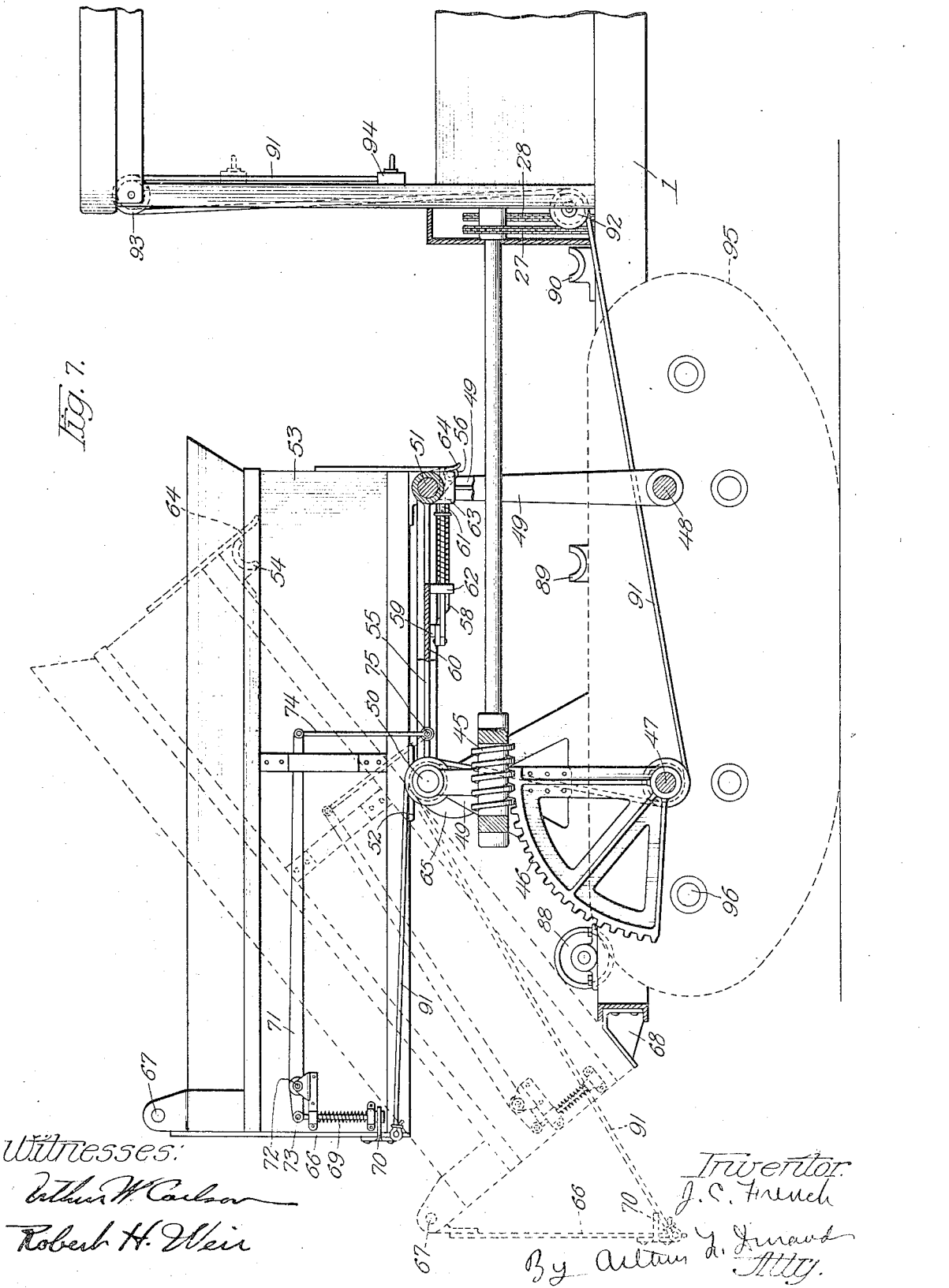

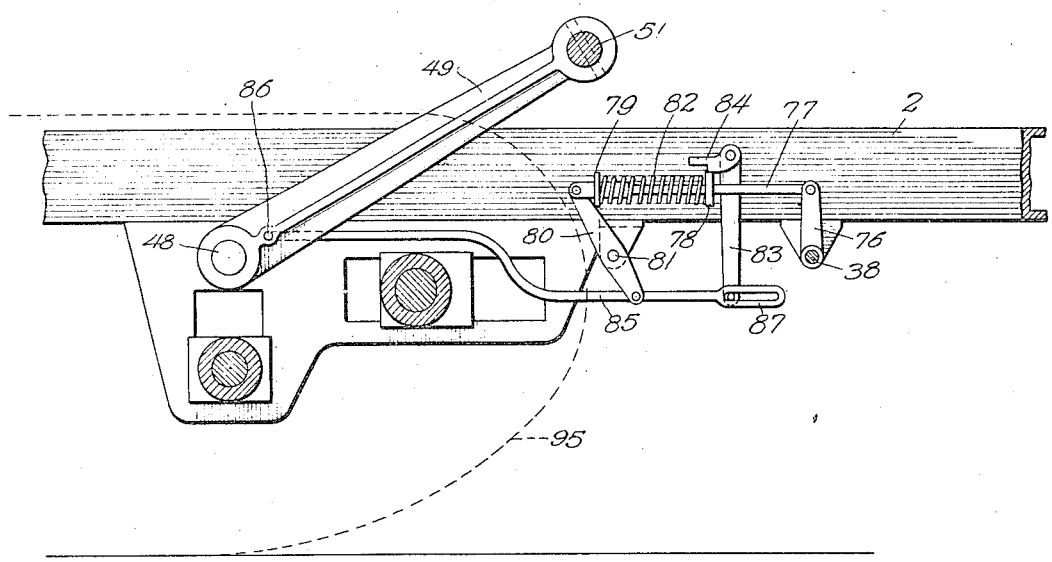
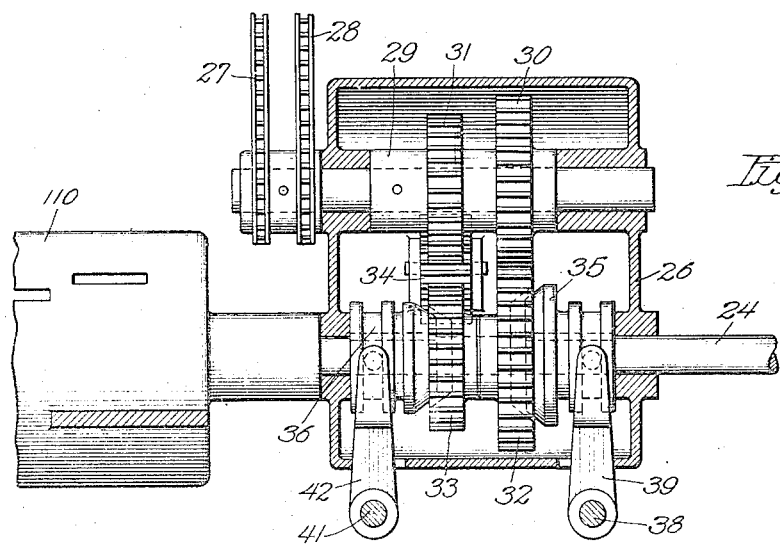

Patented Apr. 10, 1923.

1,451,018

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

MOTOR-TRUCK DUMPING VEHICLE.

Original application filed March 13, 1918, Serial No. 222,242. Divided and this application filed October 7, 1918. Serial No. 257,132.

*To all whom it may concern:*

Be it known that I, JAMES C. FRENCH, a citizen of the United States of America, and a resident of Chicago, Illinois, have invented a certain new and useful Improvement in Motor-Truck Dumping Vehicles, of which the following is a specification.

This invention relates to dumping vehicles in general, but more particularly to vehicles of that kind in which the load-carrier is in the form of a box or receptacle mounted to tilt into dumping position, and more especially does the invention relate to vehicles of this kind in which said box or receptacle is carried by a motor truck, and in which means are provided for utilizing the motive power of the vehicle to dump the load.

Generally stated, the object of the invention is to provide a novel and improved motor truck dumping vehicle of the foregoing general character.

Special objects are to provide an improved construction and arrangement for raising and lowering the load-carrier, and for tilting the same about a transverse axis for the purpose of dumping the load; to provide an improved construction and arrangement whereby the load-carrier, such as a box or rectangular receptacle, is provided with a swinging end gate which is automatically controlled to open the rear end of the box or receptacle at the proper time, and to thereby dump the load; to provide an improved construction and arrangement whereby the motive power of the motor truck is advantageously utilized for the purpose of raising the load-carrier into dumping position; to provide an improved construction and arrangement whereby the swinging gate of the box or rectangular receptacle may be closed by the driver after the load is dumped and after the box or other load-carrier is returned to the normal position which it occupies while being filled and while the load is being transported from one place to another; and to provide a general construction which will ensure greater certainty in the dumping of the load, and the return of the receptacle to carrying position.

It is also an object to provide certain details and features of construction and combinations tending to increase the general efficiency and desirability of a motor truck dumping vehicle of this particular character.

It will be seen that this is a division of application No. 222,242, filed March 13, 1918. In said prior application, the steering arrangement and the steering gear are claimed, while in this divisional application the dumping apparatus is claimed.

To the foregoing and other useful ends, the invention consists in matters hereinafter set forth and claimed, and illustrated in the accompanying drawings, in which:—

Figure 1 is a side elevation of a motor truck dumping vehicle embodying the principles of the invention.

Figure 2 is a plan of said vehicle, with the box-like receptacle which forms the load-carrier removed, and with certain portions broken away and other portions shown in section for convenience of illustration.

Figure 3 is an enlarged transverse section on line 3—3 in Figure 2.

Figure 4 is an enlarged transverse section on line 4—4 in Figure 2, looking toward the front end of the machine.

Figure 5 is an enlarged bottom plan of a portion of the tilting box or load-carrier, showing the locking mechanism by which the box or receptacle is retained in horizontal or carrying position.

Figure 6 is an enlarged vertical section on said line 4—4 in Figure 2, but looking toward the rear end of the motor truck.

Figure 7 is a diagrammatic view showing the tilting box or load-carrier in its elevated position, preliminary to being tilted into dumping position, and showing certain portions of the raising and lowering mechanism in side elevation, and certain parts in section, and showing the dumping position of the load-carrier in dotted lines.

Figure 8 is a detail vertical longitudinal section on line 8—8 in Figure 6.

Figure 9 is an enlarged detail vertical longitudinal section on line 9—9 in Figure 6.

As thus illustrated, the invention comprises a body frame or motor truck chassis comprising parallel beams 1, and the outer or auxiliary beams 2 which are disposed a distance from the beams 1 along the rear portion of the motor truck, which are bent inward at 3 to unite with the beams 1, whereby the body frame or chassis is wider at the rear end thereof than at its front end. The engine 4 is mounted upon the front end of the body frame or chassis, in the usual manner, and may be of any suitable known or approved character. The front vehicle wheels 5 are pivoted or swiveled at 6, in the usual or any ordinary manner, upon the ends of the front axle, and the two front steering wheels thus provided are connected together by a rod 7, so that the two wheels will always turn in the same direction and remain parallel. To control these wheels, thereby to steer the motor truck dumping vehicle to the right or the left, a transverse winding-drum 8 is provided at a distance in rear of the engine, and preferably at a point opposite the seat 9, which latter, it will be seen, is arranged to face crosswise of the vehicle, being preferably arranged at the extreme outer side of the body frame or chassis. The winding-drum 8 is supported in bearings 10 on the body frame, and is connected by a cable 11 with the rear ends of the bell-cranks 12 of the front steering gear, said cable being passed in opposite directions around the sheaves 13 and 14 before having the opposite ends thereof attached to the bell-cranks 12 which are rigid with the spindles of the front wheels. Thus the coiled portion 15 on the winding-drum is connected with the left hand front steering wheel 5, while the coiled portion 16 of said cable, on said drum, is connected with the right hand front steering wheel 5, the sheaves 13 and 14 being preferably mounted one above the other upon the bottom of the frame or chassis, or in any suitable or desired manner. The vertical steering column 17 is disposed in front of the seat 9, directly above the axis of the drum 8, and has its upper end provided with the usual hand wheel 18 for steering the vehicle. The lower end of this steering column 17 is provided with a beveled gear 19 which engages the bevel-gears 20 and 21 on the axis of the drum 8, the two gears 20 and 21 being loosely mounted upon the shaft which forms this axis. The intermediate sliding clutch member 22 is splined on said shaft and is provided with teeth to engage either the gear 20 or the gear 21, whereby a reversing gear mechanism is provided. If the machine is traveling forward, and if the driver desires to steer the machine to the left, the clutch member 22 is brought into engagement with the gear 20, and the hand-wheel 18 is then turned to the left by the driver, which will cause the cable 11 to control both steering wheels in the desired manner. Turning the wheel 18 to the right will then steer the motor truck to the right. However, if the machine is traveling backward, and if the driver desires to steer the motor truck to the left, then the clutch member 22 is shifted into engagement with the gear 21, and the hand-wheel 18 is then turned to the left, and while this produces the opposite adjustment of the wheels 5, still it is what is necessary to steer the vehicle to the left while it is traveling backward. In this way, therefore, and regardless of whether the vehicle is traveling forward or backward, the driver will always turn the wheel to the left to steer the vehicle to the left, and will always turn the wheel to the right to steer the vehicle to the right, and hence the steering is exactly the same for both directions, and in this way the driver is not liable to be confused when the direction of travel of the vehicle is reversed.

The engine 4 is connected by a clutch 23 with the shaft 24, which latter leads to the box 26 containing a set of reversing gears, of any suitable character, by which to reverse the motion of the two sprocket-chains 27 and 28, which sprocket-chains engage sprocket-wheels that are preferably rigid with the sleeve 29 of said reversing gear mechanism. This sleeve 29 is provided with relatively large and small gear wheels 30 and 31, and relatively large and small gear-wheels 32 and 33 are loosely mounted on the shaft 24, (see Figure 9) the gear wheel 32 engaging the gear 30, and the gear-wheel 33 engaging the idler 34, which latter in turn engaging the gear 31 on said sleeve, whereby this sleeve can be rotated either forward or backward, depending upon whether the transmission thereto is through the gear 32 or through the gear 33, in a manner that will be readily understood. A clutch 35 is provided for connecting the gear 32 to the shaft 24, when it is desired to operate the sprocket chains 27 and 28 in one direction, and a similar clutch 36 is provided for connecting the gear 33 to the shaft 24 when it is desired to operate said sprocket-chains in the opposite directions. The clutch 35 is controlled by a hand lever 37 through the medium of a rod 38 arranged transversely of the vehicle, which rod is provided with an arm 39 to engage said clutch. In a similar manner, the clutch 36 is controlled by a hand-lever 40 through the medium of a transverse rod 41 which has an arm 42 for engaging said clutch. In this way, a reversing gear mechanism is provided, controlled by the hand-levers 37 and 40, for controlling the operation of the sprocket-chains 27 and 28, it being understood that when both clutches are open said sprocket chains will remain inoperative; but, when either clutch is closed, the sprocket-chains will be operated in one direction or the other. The sprocket-chain 27 operates a longitudinal shaft 43, mounted in suitable bearings at one side of the chassis or body frame, and the sprocket-chain 28 operates a similar longitudinal shaft 44 at the other side of the vehicle. These shafts 43 and 44 are provided with worms 45 to engage the worm-gear segments 46 on the end portions of the transverse shaft 47, it being understood that these two worms 45 are rotated in the same direction to turn the shaft 47 in one direction, and are then both rotated in the opposite direction to oscillate the shaft 47 in the opposite direction. This shaft 47 is mounted in suitable bearings on the chassis or body frame, and just ahead of this shaft is another rock-shaft 48 which is also mounted in bearings on the body frame. These two shafts 47 and 48 have their end portions provided with upstanding crank-arms 49, and the upper ends of these arms are provided with transverse axles 50 and 51, the axle 50 being mounted to turn in bearings 52 on the bottom of the box or receptacle 53, which latter forms the load-carrier. The axle 51, however, is adapted to engage the concave or half bearings 54 on the bottom of the box or receptacle, whereby the latter can tilt on the axle 50 when released. For this purpose, the axle 50 is nearer to the front end of the box than the rear thereof, whereby the rear end will tilt down by gravity (see dotted lines in Figure 7). Parallel members 55 connect the two axles 50 and 51 together, and in this way the arms 49 and the members 55 form a parallel motion connection, the members 55 being always horizontal, regardless of whether they are in raised or lowered position. The axle 51 is preferably rigid with the front arms 49 and this axle is provided with a short centrally located arm 56 which is connected by a link 57 with the toggle-levers 58, which latter are pivoted at 59 upon the bottom of the transverse member 60 which rigidly connects the two members 55 previously described. The longitudinally disposed locking-bolts 61 reciprocate in guides 62 and 63 on the bottom of the frame formed by the member 60 and the members 55, so that the rear ends of these locking-bolts 61 are adapted to engage the apertured catches 64 which extend downward on the front end of the box or receptacle. In this way, the box or receptacle 53 is normally locked in horizontal position on the frame formed by the members 55 and 60, and cannot tilt upon the axis 50 until after the locking-bolts 61 have been disengaged from the catches 64, which unlocking operation automatically takes place as soon as the arms 49 are raised to their vertical positions. This is because the raising operation causes the link 57 to exert a pull on the toggle-levers 58, and the latter in turn pull the locking bolts 61 out of engagement with the catches 64, thus automatically releasing the receptacle or load-carrier 53 and allowing the latter to tilt into dumping position. The stops 65 are mounted on the sides of the chassis or body frame, in position to receive and engage the projecting end portions of the axle 50, thus limiting the upward and rearward movement of the receptacle or load-carrier when the worm-gear mechanism 45 and 46 is operated to raise the load-carrier.

Said box or load-carrier 53 has a rear gate 66 which is pivoted at its upper end 67 on the top of the box or receptacle, in any suitable or desired manner, so that this gate can swing outward and rearward (see Figure 7) when the box is tilted into dumping position, thereby to dump the load from the rear end of the receptacle. Stops 68 on the chassis or body frame engage the bottom of the rear end portion of the receptacle 53, when the latter is tilted into dumping position, thus limiting the tilting motion at such time. The gate 66 is held normally closed by spring pressed locking bolts 69 on the sides of the box 53, which locking bolts engage the apertured catches 70 carried by the gate. Longitudinally disposed levers 71 are pivoted at 72 on the sides of the box, and are pivotally connected at 73 with the upper ends of the locking-bolts 69, whereby a depression of the forward ends of these levers 71, relative to the tilting receptacle, will withdraw the locking-bolts from the apertured catches 70, and thereby release the gate and permit the load to be discharged. This is accomplished automatically through the medium of the links 74 which pivotally connect the forward ends of the levers 71 with the pivot points 75 on the sides of the members 55 previously described. With this arrangement, when the box 53 begins to tilt rearward from its horizontal position, the levers 71 will be gradually tilted relative to the box or receptacle (see dotted lines in Figure 7) with the final result that the locking-bolts 69 are automatically disengaged from the catches 70, thereby releasing the gate. Of course, the operation of the different devices can be so timed, relatively to each other, that the box 53 will be released by the locking-bolts 61, and will be tilted into its inclined position to engage the stop 68, at about the time that the ends of the axle 50 engage the stops 65, thus accomplishing the desired dumping operation as a final result of the raising of the box or receptacle into its upper position.

When thus raised and tilted into its dumping position, the movement of the box in this manner can be terminated by an operation of the hand-lever 37, to open the clutch 35, but this can also be done automatically, as follows:—The transverse rod 38 has its other end provided with an upstanding arm 76 which is pivotally connected with the front end of a longitudinally disposed rod 77 having a shoulder 78, said rod having its end portion provided with a sliding member 79, so that the rod in effect has a telescoping action, being capable of lengthening and shortening, and the end of this sliding member 79 being pivotally connected with the upper end of a lever 80 which is pivoted at 81 on the body frame or chassis of the vehicle. A spring 82 is interposed between the shoulder 78 and the shoulder afforded by the sliding member 79, so that the operation which in effect tends to shorten this rod 77 will compress said spring. To obtain this compression, a bell-crank-lever 83 has its short upper arm provided with a notch 84 to engage the shoulder 78, so that the latter will be held stationary while the spring is being compressed by forward movement of the member 79, in a manner that will be readily understood. The lower end of the lever 80 is connected by a rod 85 with the pivotal point 86 on one of the arms 49, whereby the gradual upward movement of these arms 49 tends to gradually compress the spring 82, but this compression is interrupted and the spring is allowed to expand as soon as the notch 84 is disengaged from the shoulder 78, which operation is automatically accomplished as follows:—The forward end of the rod 85 is provided with a slotted portion 87 which has a lost-motion-connection with the lower end of the bell-crank lever 83, so that the endwise movement of the rod 85 does not affect the lever 83 until the lost-motion is taken up, and as soon as the end of the slot is reached the lever 83 is then given a pull by the final endwise movement of the rod 85 and this disengages the notch 84 from the shoulder 78, permitting the spring 82 to suddenly shift the rod 77 endwise in a forward direction. This, it will be seen, quickly oscillates or rocks the rod 38, which controls the clutch 35, and this opens the clutch 35 and stops the operation of the worm-gearing 45 and 56 by which the box is raised. As soon as the load is out, the driver will then operate the lever 40, to close the clutch 36, thus reversing the operation of said worm-gearing and causing the box to gradually descend, its rear end at this time being supported by rollers 88 on the rear end of the chassis or body frame. When the box or receptacle 53 reaches its lowered position, the axles 50 and 51 will then engage the supports 89 and 90 on the sides of the chassis or body frame, these supports being in the form of half bearings which support the ends of said axles, so that the latter support the box or receptacle directly on the sides or frame members of the chassis when the box is in carrying position. The lowering of the box also serves to automatically bring the locking-bolts 61 automatically into engagement with the catches 64, so that the box or load-carrier is locked in horizontal position.

Any suitable arrangement can be employed for pulling the gate 66 into closed position, or for slamming it shut, if the catches 70 do not easily engage the locking-bolts 69 when the gate swings back into closed position. For example, an operating cord or rope 91 can be secured to the lower end of said gate and then extended forward over the axle 50, when below the transverse shaft 47, then forward and around a sheave 92 on the body frame, and then upward and over a sheave 93 on the frame of the cab of the vehicle, and then downward to a weight 94 by which the gate will be automatically pulled into closed position. This weight can have a handle so that the driver can move it up or down, if such is desirable or necessary.

The vehicle can be propelled in any suitable or desired manner. As shown, caterpillars 95 are provided for this purpose, being disposed under the rear portion of the truck, to support the weight of the load, and being operated by a rear axle 96 through the medium of any suitable gear connection or power-transmitting connection with the shaft 24 of the engine. Foot-pedals, it will be understood, can be disposed within reach of the driver occupying the seat 9, to control the transmission, so that the motor truck can be driven ahead at the desired speed, or may be backed up when necessary, the caterpillars 95 being substituted for the rear driving wheels of an ordinary automobile or motor truck and being capable of propelling the vehicle in either direction at suitable speed. The clutch 22, it will be seen, is controlled by a hand-lever 97 disposed within reach of the driver, and the clutch 23 has a foot-pedal 98 which is within reach of the driver, and the device ordinarily employed for changing the speed of the vehicle, or for reversing the direction of travel, such as those ordinarily employed on motor trucks or automobiles, can be controlled, as previously explained, by foot-pedals or any other suitable means, arranged within reach of the driver. Obviously, however, the driver is in a position to not only control the traveling movements of the motor truck dumping vehicle, but can also supervise the loading of the box or receptacle, as well as the dumping of the load. The driver sits at one side of the vehicle in a position to face the other side thereof, with the hand-wheel 18 directly in front of the seat 9, and with the reversible steering gear, as previously described, the turning of the vehicle to either the right or the left is always accomplished by the same movement of the hand-wheel, regardless of whether the vehicle is traveling backward or forward, so that the driver is not as liable to become confused in controlling the movements of the vehicle as would be the case with ordinary steering gear. As shown, the rear axle 96 has a differential gearing 99 which is operated by the gear 100 on the driving shaft, and the latter is provided with a suitable reversing gear and clutch mechanism 101 controlled, through suitable connections 102 and 103 and 104, by the hand-lever 97, previously described, which is placed conveniently within reach of the driver. In this way, the vehicle is reversible at any speed, either high or low or intermediate, in a manner that will be readily understood. When the lever 97 is operated to reverse the steering gear, the same operation automatically reverses the driving gear 100, so that reversal of the direction of travel is accompanied automatically by a reversal of the steering gear. Between the reversing gear mechanism 101 and the shaft 105, which latter is disposed in longitudinal alinement with the shaft 24, there is a brake 106 which is controlled through the connections 107 and 108 by the foot-pedal 109, the latter being disposed within reach of the driver. In this way, the transmission of power from the engine to the caterpillars 95 can be controlled at will, by opening and closing the clutch 101, thereby to either start or stop the vehicle, or to change the direction of travel thereof. Also, a gear-set or gear-box 110 is arranged to connect the shaft 105 with the shaft 24, which latter extends through the clutches 35 and 36 previously described, and in this gear-box or gear-set 110 any suitable means may be employed, such as those ordinarily found on automobiles, for changing the speed of the vehicle. As shown, two connections 111 and 112 are shown leading from this gear box 110 to a position adjacent the driver, where they are controlled by a hand-lever 113, which can be shifted from one connection to the other, thereby to change the speed from low to high, or vice versa, in a manner that will be readily understood. Of course, though, as previously stated, this gear-box 110 may contain gearing sufficient for intermediate speed, as well as for high and low speeds, if such is necessary or desirable. From the foregoing it will be seen, therefore, that the vehicle can be moved either forward or backward, at different speeds, and that the driver's seat is disposed in position to enable the driver to easily control not only the forward or backward propulsion of the vehicle, in the desired manner, but also the raising and lowering of the box or load-carrier. In this way, the vehicle can be controlled and manipulated in an advantageous manner to receive a load and then transport it to the place where it is to be dumped. Also, by means of the clutch mechanism 101, the direction of travel of the vehicle can be reversed at any speed afforded by the gear-set or gear-box 110, and in this way, the machine can be propelled forward or backward at any speed afforded by this chain speed gearing 110, in a manner that will be readily understood.

The load carrier 53 has a front carrying position and a rear dumping position, and the latter is higher than the former,—so that the load is raised before it is dumped. Thus the weight of the load is carried a desirable and safe distance forward on the chassis, but is shifted rearward to clear the rear end of the chassis when the carrier is shifted into dumping position. The elevated stops 65 not only limit the rearward motion of the load carrier, but also support, or partially support, the weight of the load during the discharge thereof, said stops being suitably formed or shaped for this purpose. Thus the center of gravity is much farther to the rear while the load is being dumped, than while being transported, so that the load is carried in a way that ensures the proper traction and steering action of the wheels of the vehicle. The blow struck by the end portions of the shaft 50 against the stops 65 is followed immediately by the gravitational tilting of the load carrier and the violent jarring effect produced by the impact of the bottom of the box or cover 53 on the bumper 68 at the extreme rear of the vehicle, so that the load is jarred loose and plunged down the inclined carrier. The power for lifting the load, and for shifting it rearward, is derived from the engine of the vehicle, as previously explained, through the medium of the gearing shown in Figure 9, which constitutes a lateral power-take-off from the engine shaft 24 at a point between the clutch 23 and the usual or ordinary transmission gearing contained in the casing 110, as previously explained.

What I claim as my invention is:—

1. A motor truck dumping vehicle comprising a chassis, a load-carrier, mechanism on said chassis to raise the load-carrier and shift it backward over the rear end of the chassis, means on said mechanism to provide a transverse axis of tilting motion for said load-carrier, and devices supported by said mechanism to prevent the load carrier from tilting while rising and for causing the load-carrier to tilt into a dumping position after being elevated by said mechanism.

2. A structure as specified in claim 1, said load-carrier being adapted to tilt by gravity into dumping position, and said devices comprising locking means to hold the load-carrier in horizontal position, and means for automatically operating said locking means to permit tilting of the load-carrier into dumping position.

3. A structure as specified in claim 1, said load-carrier having a rear door, and means for automatically opening said door as the load-carrier tilts into dumping position.

4. A structure as specified in claim 1, said mechanism comprising a parallel motion connection between said chassis and said load-carrier, and means for operating said parallel motion connection to move the load-carrier upward and rearward before the tilting thereof.

5. A structure as specified in claim 1, in combination with means to reversibly connect said mechanism with the motive power plant of said motor truck.

6. A structure as specified in claim 1, and means to automatically stop the upward movement of the load-carrier.

7. A structure as specified in claim 1, said mechanism comprising a transverse rock-shaft, worm-gearing for oscillating said rock-shaft, and connections between said shaft and the bottom of said load-carrier.

8. A structure as specified in claim 1, and means to automatically lock the load-carrier in horizontal position when lowered.

9. A structure as specified in claim 1, and means to automatically stop the raising of the load-carrier.

10. A structure as specified in claim 1, and means on the rear end of the chassis to support the load-carrier while in dumping position and while returning to the lowered position thereof.

11. A motor truck dumping vehicle comprising a chassis, a load-carrier, mechanism on said chassis to raise the load-carrier, means on said mechanism to provide a transverse axis of tilting motion for said load-carrier, and devices for causing the load-carrier to tilt into a dumping position after being elevated by said mechanism, said load-carrier being adapted to tilt by gravity into dumping position, and said devices comprising locking means to hold the load-carrier in horizontal position, and means for automatically operating said locking means to permit tilting of the load-carrier into dumping position.

12. A motor truck dumping vehicle comprising a chassis, a load-carrier, mechanism on said chassis to raise the load-carrier, means on said mechanism to provide a transverse axis of tilting motion for said load-carrier, and devices for causing the load-carrier to tilt into a dumping position after being elevated by said mechanism, said mechanism comprising a transverse rock-shaft, worm-gearing for oscillating said rock-shaft, and connections between said shaft and the bottom of said load-carrier.

13. A motor truck dumping vehicle, comprising a chassis, a load carrier, mechanism to support said load carrier on the chassis, means to connect said mechanism with the motive power of the vehicle, said mechanism being adapted to raise the load carrier to an elevated position, and instrumentalities for causing the load carrier to tilt in its elevated position to discharge the load therefrom, said instrumentalities operating automatically to tilt the load carrier to dumping position by gravitational movement thereof about a transverse axis on said mechanism.

14. A motor truck dumping vehicle, comprising a chassis, a load carrier, mechanism to support said load carrier on the chassis, means to connect said mechanism with the motive power of the vehicle, said mechanism being adapted to raise the load carrier bodily and shift it rearwardly while supported on spaced horizontal supports, so that the load carrier does not tilt until after reaching its elevated and rearward position, and instrumentalities for automatically releasing the load carrier in its elevated position to permit it to tilt to discharge the load therefrom.

15. In a motor truck dumping vehicle, the combination of a load-carrier, instrumentalities for raising the load carrier bodily and thereafter causing said load-carrier to tilt from its horizontal elevated position into an inclined dumping position to discharge the load therefrom, and means to connect said mechanism with the motive power of the vehicle to raise the load carrier bodily into position to tilt by gravity into dumping position.

16. In a motor truck dumping vehicle, the combination of means to carry the load, means to raise and shift the load rearward, means to limit said rearward movement of the load, means whereby the sudden interruption of the rearward movement causes a gravitational motion of the load about a transverse axis, and means to suddenly interrupt the gravitational motion to dump the load at the desired angle of discharge.

JAMES C. FRENCH.